2,877,203
POLYVINYL HALIDE COMPOSITION CONTAINING OXIDIZED POLYESTER RESIN, AND METHOD OF MAKING SAME

Alan K. Forsythe, Manor Township, Lancaster County, and John A. Parker, Lancaster Township, Lancaster County, Pa., assignors to Armstrong Cork Company, Lancaster, Pa., a corporation of Pennsylvania No Drawing. Application June 29, 1955
Serial No. 518,936

15 Claims. (Cl. 260—45.4)

This invention relates generally to surface covering materials, and more particularly to a binder system for surface coverings. Still more particularly, it relates to a binder system for surface covering materials wherein the binder system comprises a polymerized vinyl halide and an oxidized polyester.

In recent years, a tough, resilient plastic surface covering has been produced by forming a composition containing filler and a binder, the binder including a polymerized vinyl halide such as a polyvinyl resin and a butadiene-acrylonitrile copolymer, calendering the composition into a sheet, and curing the resulting material in air at elevated temperatures. The basis of the binder of the composition may be a mixture of polyvinyl chloride and a butadiene-acrylonitrile copolymer, which copolymer advantageously contains 40%–70% by weight of butadiene and about 30%–60% by weight acrylonitrile. Such a mixture may be obtained by the method described in Henderson Patent No. 2,330,353, in which a polyvinyl chloride and a butadiene-acrylonitrile copolymer are compounded by milling the polyvinyl chloride into the copolymer until a homogeneous mass is obtained. Although surface covering materials fabricated from a binder system as described above have been satisfactory, there is always a need for other binder systems which possess desirable properties to an even greater extent than can be obtained from those currently available. Thus, a binder system possessing greater wet wear abrasion resistance and enhanced tensile strength, while at the same time preserving the necessary other properties needed in a surface covering material, would be extremely advantageous.

It is the primary object of the present invention to present such a binder. It is a further object to present a novel binder system for surface covering materials, which binder system may be prepared and processed on equipment normally in use in the surface covering industry.

To this end, the present invention contemplates a binder system comprising about 48%–62% by weight polymerized vinyl halide and about 52%–38% by weight of an oxidized sulfur-curable polyester. The polyester is the reaction product of a four-carbon saturated glycol, a saturated dibasic acid having a carbon chain of 6–10 carbon atoms, and a dibasic acid possessing a single unsaturated carbon-to-carbon bond and containing 4–8 carbon atoms. The saturated acid and the unsaturated acid must be present in the polyester in a mole ratio of about 2:1. Additionally, the polyester must have an acid number in the range of about 2–15 and a hydroxyl number in the range of about 20–45.

To produce a floor covering having desirable patterns without the use of special equipment or excessive horsepower, the basic component of the binder advantageously contains about 48% to about 62% by weight polymerized vinyl halide, for example, polyvinyl chloride, and about 52% to about 38% by weight of the polyester. When less than about 38% by weight of the polyester is found in the basic binder component, the composition is too tough and requires excessive horsepower and equipment of great strength in order to work the composition. However, when more than about 52% by weight of the polyester is present, the material is too elastic to be worked, and it is difficult to obtain the desired pattern in the finished floor covering. On the other hand, when the polyvinyl resin component of the binder exceeds about 62% by weight, the material is too tough for handling and tends to overload the equipment, with undesirable results. When less than about 48% by weight of the basis component of the binder is polyvinyl chloride, the final product is characterized by undesirable physical properties from the standpoint of a surface covering material, as will be more fully hereinbelow set forth.

The polyester utilized in the present invention is one having narrow and critical properties. It may be prepared only from three classes of ingredients. The first ingredient must be a four-carbon saturated glycol, as for example 1,3-butylene glycol, 1,4-butylene glycol, diethylene glycol, and the like.

The second ingredient must be a saturated dibasic acid having a carbon chain of 6 to 10 carbon atoms, as for example adipic, sebacic, azaleic, methyl adipic acids, and the like.

The third ingredient is a dibasic acid possessing a single unsaturated bond and having 4 to 10 carbon atoms, as for example tetrahydrophthalic, maleic, malonic, fumaric, and similar acids. The ratio of saturated dibasic acid to the unsaturated dibasic acid must be about 2:1 on a mole basis. Generally, the total hydroxyl equivalents in the glycol will equal the total carboxylic acid equivalents in the two acids, except for the fact that it is customary to use an excess of glycol in the making of polyesters.

The preparation of the polyester may be carried out in accordance with known polyester technics. Preferably, the excess glycol may be caused to react with the unsaturated acid at a temperature of about 80°–100° C. Because the unsaturated acids may sublime very readily at higher temperatures, the mixture of glycol and unsaturated acid is heated until the half ester of the unsaturated acid is formed. The end of the formation of the half ester can readily be seen by the disappearance of the white solid unsaturated acid from the solution, causing the solution to become homogeneous. Maleic anhydride reacts the fastest, and usually requires about 5 to 10 minutes for the formation of the half ester. Tetrahydrophthalic anhydride and endomethylene tetrahydrophthalic anhydride react more slowly because they are less soluble in the glycols.

Once the half ester is formed, the unsaturated acid is more stable at elevated temperatures. Subsequent to the formation of the half ester of the unsaturated acid, the saturated dibasic acid may be added and the temperature of the mixture may be increased to about 145° C.

During the addition of the unsaturated and saturated acid, an inert gas flow should be maintained through the solution to eliminate side reactions that might occur in the presence of air. Most of the unsaturated acids used are sensitive to oxygen; the double bond oxidizes readily. This oxidation of the double bond might lead to cross linking of chains and subsequent formation of a gel, an undesirable reaction at this point. The ease with which this oxidation occurs is dependent upon the unsaturated acid used. The ester containing maleic anhydride and endomethylene tetrahydrophthalic anhydride oxidizes more easily than tetrahydrophthalic anhydride.

After holding the temperature at 145° C. for a suitable period of time, for example about 1 hour, the temperature may be increased slowly, for example to about 200° C, The time required for this increase of temperature is dependent upon the boiling point of the glycol used. If the boiling point of the glycol is below 210° C., the time required would be on the order of 2 to 3 hours, while boiling points above 210° C. allow a reduction of time to about 1 to 1½ hours.

The temperature should be held at about 200° C. until an acid number of about 30 is obtained. For glycols boiling above about 210° C. the temperature may be then increased from 200° C. to 220° C.; but for those boiling below 210° C. the temperature should be maintained at about 200° C. In any case, these temperatures should be maintained at their respective levels until the final end point is reached.

In the later stages of polymerization, where the acid number is below about 30 and the hydroxyl number is to be lowered, the rate of decrease of the hydroxyl number may be dependent upon the rate of flow of carbon dioxide gas and the temperature of the polyester. In order to obtain a rapid decrease of the hydroxyl number in the later stages of polymerization, the temperature of the polyester should be above the boiling point of the glycol used and the gas flow increased to such a rate that the volatile glycol is swept from the reaction mixture. For the polyesters to be suitable for use in the present invention, it is desirable to obtain an acid number in the range of about 2–15 and a hydroxyl number in the range of about 20–45. A preferred embodiment calls for an acid number in the range of $5\pm2$ and a hydroxyl number of $35\pm5$. With these latter limits on acid numbers and hydroxyl numbers, the number average molecular weight will vary from about 3400 to about 2380.

Once the polyester has reacted to the desired end point, it may be immediately oxidized or it may be cooled and subsequently reheated and oxidized at that time. The polyester may be charged to any suitable oxidizer, which may be a jacketed kettle containing agitators such as paddles. The polyester is subjected to oxidation by passing a stream of air or oxygen through the mass which has been heated to a temperature such as about 170° F. to about 220° F. In some instances, depending upon the particular charge to the oxidizer, it may be desirable to operate at lower temperatures.

Oxidation is allowed to proceed while agitating the mass and maintaining the elevated temperature until the material thickens to a gel-like structure; this normally requires about 5 to 35 hours. A soft, tacky, semi-elastic gel defines the oxidation end-point. The precise point at which oxidation is to be stopped will depend, to some extent, on the properties desired in the final product. The effect of a stiffer gel in the oxidized polyester will be discussed later. Although no driers are necessary to aid in the oxidation step, driers may be added if desired.

Subsequent to oxidation, the polyester may be removed from the oxidizer and utilized with polyvinyl chloride to form the binder system as described below. The polymerized vinyl halide is preferably polyvinyl chloride and is of low molecular weight, generally less than about 3000, and of small particle size, generally less than about 5 microns. The preferred material is that sold under the name "Geon 126" by B. F. Goodrich Chemical Company.

Generally speaking, the binder comprises about 50% to about 30% by weight of the wearing surface composition. The binder component of the surface covering is admixed with filler, including pigment, in such proportions that the filler comprises about 50% to about 70% by weight of the composition. When the filler content is below about 50%, pattern control is difficult. However, when more than about 70% by weight of filler is present, the physical properties of the finished surface covering material do not measure up to the desired standards, particularly in the floor covering art. Particularly advantageous results have been obtained when the filler includes a preponderant proportion by volume of fibrous filler such as wood flour, cork particles, asbestos, mineral fibers, and the like. The remainder of the filler component is comprised of finely divided particles such as whiting, clay, silica, slate flour, and similar nonfibrous filler material. Also included in the filler components are small but effective amounts of well-known vulcanizing agents, curing accelerators, lubricants, and the like. The total amount of such compounding agents is generally up to about 10% by weight of the filler.

In an advantageous embodiment of known processes, the filler-binder mixture to be calendered is characterized by a Mooney plasticity of between 20 points and 80 points at 212° F. When plasticity of the composition is below 20 points, the finished surface covering material has too little strength. On the other hand, when the plasticity is more than about 80 points, the material is so tough that it is exceedingly difficult to process. This plasticity of the composition may be obtained in a number of ways. For example, the degree of oxidation of the polyester may be controlled so that the polyester may be a comparatively soft and elastic mass; and hence when combined with the polyvinyl chloride, it imparts a high order of plasticizing action to the final blend. Another method of obtaining the desired plasticity in the composition to be calendered is that involving the addition of still another plasticizer to the blend of polyester and vinyl resin. Typical plasticizers which may be incorporated in the composition to be calendered are dioctyl phthalate, dicapryl phthalate, dibutyl sebacate, dibutoxy ethyl phthalate, tricresyl phosphate, and the like. If desired, the plasticity may be obtained by a combination of these technics. Compositions containing as the binder component about 39% to about 53% by weight of polyvinyl chloride and about 30% to about 44% by weight of the polyester and between about 10% and about 24% by weight of additional plasticizer are particularly suitable for calendering into a sheet to produce a surface covering material.

As can be seen from the above, the compositions comprise a binder containing polyvinyl chloride and an oxidized polyester. It is also possible to utilize a composition which contains other ingredients besides the basic binder components. For example, vinyl chloride-vinyl acetate copolymer may be incorporated into the binder, as well as synthetic rubbers such as butadiene-styrene copolymers, butadiene-acrylonitrile copolymers, chloroprene polymers, and the like. Also, a portion of the binder may be replaced by additional and different polyesters.

In producing the composition to be calendered, the ingredients are weighed and mixed in an intensive mixer such as a Banbury. The resulting mixture is then subjected to further mixing on a mill, followed by cooling of the mix. Alternatively, the sheet from the mill may be immediately laminated to a backing. The slab from the mill may, if it has been cooled, be subdivided to the desired particle sizes and the resulting mixture of finely divided particles may be passed through a calender in an operation to be described more fully below.

In the preferred embodiment of the plastic surface covering preparation, the loose mass of particles which is subjected to the operations of the calender are such that the preponderant proportion is in the range of about 8 mesh to dust. Particles of such size may be calendered without danger of blisters forming on the face of the sheeet. It is particularly advantageous to have at least 60% of the particles in the mass to be calendered in the range of about 8 mesh to dust. The completed formulation may be calendered into a sheet which may be applied to a backing at the same or a subsequent stage of the process. The backing material may be any of a number of materials employed in the production of resilient surface covering material. For example, it may be burlap or a saturated felt such as an asphalt-saturated felt, a resin-saturated felt, or a felt which has been saturated with rubber or synthetic rubber as by the beater saturation process. Thus, the fabric backing will include such materials as woven fabric, for example burlap, canvas, or cotton sheeting, and felted fibrous products such as saturated felt.

The composition obtained as indicated above is calendered into a sheet by passing the material through a calender in which the face roll is generally at a lower temperature than the back roll. The temperature of the roll varies, depending upon the desired pattern. For example, to obtain plain or striated effects, the face roll temperature should be in the range of about 80°–150° F. Generally speaking, the temperature of the back roll is advantageously maintained at a temperature of about 120°–220° F.

Following the production of the sheet as indicated above, the material is then cured at elevated temperatures. The cure may be accomplished in curing presses, but particularly advantageous results have been obtained by suspending the material in air and heating the suspended material at elevated temperatures. In order to obtain maximum physical properties, it is advantageous to utilize comparatively high temperatures such as 250° F. Good cures can be obtained in the range of about 225° F. to about 275° F. Higher temperatures than about 275° F. result in an extraordinary degree of stove staining. Excellent results are generally obtained by curing the sheet in stoves at temperatures of about 250° F. for a period of about 8 to about 30 hours. The temperature should be raised gradually to prevent formation of blisters due to sudden exposure to heat. If desired, the final product may be given a high gloss by the application of lacquer and wax after the curing operation.

Although such surface covering materials are particularly suited for use as floor coverings, the materials may also be employed as a covering for walls, desk tops, counter tops, sink tops, stable tops, and the like.

The following examples illustrate several embodiments of the present invention. All parts are by weight unless otherwise stated.

*Example I*

To a 3 liter 3-necked flask fitted with a sealed stirrer, an electrically heated reflux condenser attached to a water-cooled take-off condenser, an inlet for the admission of carbon dioxide gas, a thermo regulator, and a thermometer, was added 643 parts (7.14 moles, 19% excess) 1,4-butanediol. The dried carbon dioxide flow rate was kept at 0.3 liter per minute and the temperature of the 1,4-butanediol was increased to 80° C. To the heated 1,4-butanediol was added 304.3 parts (2 moles) of tetrahydrophthalic anhydride. The anhydride was added slowly to the reaction mixture so there would not be a sharp decrease in temperature. Mixing was continued until a homogeneous solution was obtained, and then 584.8 parts (4 moles) adipic acid was added slowly to the hot stirred mixture. After all the adipic acid was added, the temperature was increased to 145° C. over a period of 30 minutes and held at that temperature for 1 hour. The gas flow was kept at 0.3 liter per minute, and at a temperature of 145° C. some water started to distill off.

The temperature was then raised to 200° C. over a period of 90 minutes and maintained at this temperature until an acid number of 30±2 was obtained. The time required to reach an acid number of 30±2 was approximately 400 minutes. When an acid number of 30 was obtained, the temperature of the mixture was raised to 230° C. over a period of 60 minutes and the flow of carbon dioxide was increased to 2.5 liters per minute. The temperature was maintained at 230° C. for 200 minutes, after which the temperature was increased to 245° C. over a 60-minute period and the gas flow was increased to 3.5 liters per minute. The batch temperature was maintained at 245° C. until an acid number of 3–6 was obtained. The final hydroxyl number was 27.

The polyester was subsequently cooled, yielding a thick, viscous, amber-colored liquid.

*Example II*

To a 5 liter 4-necked flask equipped as described in Example I was added 1,928 parts (21.4 moles, 19% mole excess) 1,4-butanediol and 588 parts (6 moles) maleic anhydride. The mixture was heated, and after about 20 minutes the maleic anhydride was in solution and 1,754 parts (12 moles) adipic acid was added. The gas flow was maintained at 0.4 liter of carbon dioxide per minute. After the adipic acid was added, the temperature of the mixture was increased to 140° C. over a period of 45 minutes and held at this temperature for 120 minutes. Over a period of 225 minutes, the temperature of the polyester was increased to 200° C. and was maintained at 200° C. for 620 minutes. After an acid number of 15 was obtained, the temperature was increased to 215° C. over a period of 15 minutes and was held at that temperature for the remainder of the reaction cycle. The total reaction time for the preparation of this polyester was 1100 minutes and the final acid number and hydroxyl number was 12 and 36, respectively.

*Example III*

A mixture of 1,609 parts (17.88 moles, 19.2% mole excess) 1,4-butanediol and 820 parts (5 moles) endomethylene tetrahydrophthalic anhydride was heated in a 5 liter 4-necked flask equipped as described in Example I. After the endomethylene tetrahydrophthalic anhydride was dissolved, 1,461 parts (10 moles) adipic acid was added and the temperature was increased to 145° C. over a period of 50 minutes. The temperature was held at 145° C. for 120 minutes and then increased to 200° C. over a period of 60 minutes. The gas flow was maintained at 0.4 liter of carbon dioxide per minute. The temperature was held at 200° C. until an acid number of 10 was obtained. The hold time at 200° C. was approximately 615 minutes. Over a period of 60 minutes the temperature was raised to 215° C. and the gas flow was increased at the same time to 4.0 liters per minute. The reaction was terminated when an acid number of 3.8 and a hydroxyl number of 40 was obtained. The total time required for the preparation of this polyester was 1630 minutes.

*Example IV*

500 parts of the polyester prepared as in Example I was placed in a container and maintained at a temperature of 180° F. under constant agitation. Air was bubbled through the heated mass at the rate of 6 liters per minute for 480 minutes. At the end of that time, the polyester had achieved incipient gellation, whereupon it was discharged and cooled. The cooled mass was a sticky, solid gel. No driers were used during the oxidation.

*Example V*

As in Example IV, portions of the polyesters prepared as in Examples II and III were converted to incipient gels. The time of oxidation was 4500 minutes. No driers were used.

The oxidized polyester in each case was a stiff, sticky gel on cooling.

*Example VI*

Using the polyester as prepared in Example IV, the following formulation was prepared:

| | Parts |
|---|---|
| Polyester | 265 |
| Geon 126 (polyvinyl chloride) | 265 |
| Tricresyl phosphate | 40 |
| Whiting | 288 |
| Wood flour | 132 |
| Stearic acid | 4 |
| International fiber | 180 |

|  | Parts |
|---|---|
| Titanium dioxide | 100 |
| Ceresin wax | 8 |
| Vanstay L (light stabilizer) | 6 |
| Captax (mercapto benzothiazole) | 8 |
| Cumate (copper dimethyl-dithiocarbamate) | 0.4 |
| Sulfur | 6 |
| Vultac No. 3 (alkyl phenol sulfide, plasticizer, and vulcanizing agent) | 8 |
| Zinc oxide | 16 |

The above ingredients were mixed on an internal mixture to a temperature of 210° F., whereupon they were sheeted on a cold mill to a thickness of 0.030.

A portion of the sheeted product was laminated to a felt backing. Other portions were left unbacked.

Cure on all products was achieved by placing the product in an oven maintained at 220° F. for 36 hours. Other samples were cured at 250° F. for 12 hours.

The following results were obtained from tests made on the unbacked cured specimen:

|  | Polyester | Control |
|---|---|---|
| Indentation, inches | 0.010 | 0.010 |
| Residual indentation, inches | 0.002 | 0.002 |
| Tensile strength, lbs./sq. in | 1,178 | 1,100 |
| Percent elongation | 17 | 25 |
| Sandpaper abrasion, loss in cc., dry | 1.00 | 1.00 |
| Sandpaper abrasion, loss in cc., wet | 1.56 | 1.60 |
| Wet wear abrasion, 5% NAOH | 0.73 | 1.00 |

The control sheet was prepared in identical manner with identical ingredients as the above-described sheet, save that instead of the polyester ingredient, the control sheet contained a butadiene-acrylonitrile copolymer.

*Example VII*

Polyesters as oxidized in Example V were incorporated into a formulation as in Example VI, formed into sheets, cured, and tested. Good surface covering materials resulted.

We claim:

1. A binder system for surface covering materials comprising about 48–62% by weight polymerized vinyl halide and about 52%–38% by weight of sulfur-curable polyester oxidized with oxygen to a soft, tacky, semi-elastic gel, said polyester being the reaction product of a saturated glycol having 4 carbon atoms, a saturated dicarboxylic acid having a carbon chain of 6–10 carbon atoms, and a dicarboxylic acid possessing a single olefinic unsaturated bond and 4–8 carbon atoms, said saturated acid and said unsaturated acid being present in a mole ratio of about 2:1, said reaction product having an acid number in the range of about 2–15 and a hydroxyl number in the range of about 20–45.

2. A binder system according to claim 1 wherein said polymerized vinyl halide comprises polyvinyl chloride.

3. A binder system according to claim 1 wherein said reaction product comprises butylene adipate tetrahydrophthalate.

4. A binder system according to claim 1 wherein said reaction product comprises butylene adipate maleate.

5. A binder system according to claim 1 wherein said reaction product comprises butylene adipate endomethylene tetrahydrophthalate.

6. A binder system according to claim 1 wherein said reaction product has an acid number in the range of about 3–7 and a hydroxyl number in the range of about 30–40.

7. A binder system for surface covering materials comprising about 48%–62% by weight polyvinyl chloride and about 52%–38% by weight of a sulfur-curable polyester, said polyester being oxidized with oxygen to a soft, tacky, semi-elastic gel and being the reaction product of 1,4-butanediol, adipic acid, and a dicarboxylic acid possessing a single olefinic unsaturated bond and 4–8 carbon atoms, said adipic acid and said unsaturated acid being present in a mole ratio of about 2:1, said reaction product having an acid number in the range of about 2–15 and a hydroxyl number in the range of about 20–45.

8. A binder system according to claim 7 wherein said reaction product has an acid number in the range of about 3–7 and a hydroxyl number in the range of about 30–40

9. A binder system according to claim 7 wherein said dicarboxylic acid comprises tetrahydrophthalic anhydride.

10. A binder system according to claim 7 wherein said dicarboxylic acid comprises maleic anhydride.

11. The method of making a binder system for surface covering materials which comprises intimately blending a polymerized vinyl halide and a polyester oxidized with oxygen to a soft, tacky, semi-elastic state, said polyester being formed by reacting at elevated temperature a 4-carbon saturated glycol, a saturated dicarboxylic acid having 6–10 carbon atoms, and a dicarboxylic acid possessing a single olefinic unsaturated bond and 4–8 carbon atoms to achieve an acid number in the range of about 2–15 and a hydroxyl number in the range of about 20–45, said reactants being present in said reaction product in the ratio of about 3 moles glycol, about 2 moles saturated acid, and about 1 mole unsaturated acid.

12. The method according to claim 11 wherein said polymerized vinyl halide comprises polyvinyl chloride.

13. The method according to claim 11 wherein said glycol comprises 1,4-butylene glycol.

14. The method according to claim 11 wherein said saturated dicarboxylic acid comprises adipic acid.

15. The method according to claim 11 wherein said polymerized vinyl halide comprises polyvinyl chloride, said glycol comprises 1,4-butylene glycol, and said saturated dibasic acid comprises adipic acid.

References Cited in the file of this patent

UNITED STATES PATENTS

| 1,901,374 | Luther | Mar. 14, 1933 |
| 2,036,009 | Wright | Mar. 31, 1936 |
| 2,195,362 | Ellis | Mar. 26, 1940 |
| 2,555,062 | Small et al. | May 29, 1951 |